United States Patent [19]

Violante et al.

[11] Patent Number: 5,366,712
[45] Date of Patent: Nov. 22, 1994

[54] CERAMIC CATALYTIC MEMBRANE REACTOR FOR THE SEPARATION OF HYDROGEN AND/OR ISOTOPES THEREOF FROM FLUID FEEDS

[75] Inventors: Vittorio Violante; Livio Bettinali; Luigi Bimbi; Enrico Drioli, all of Rome, Italy

[73] Assignee: ENEA-Ente per le Nuove Tecnologie, l'Energia e l'Ambiente, Rome, Italy

[21] Appl. No.: 12,854

[22] Filed: Feb. 3, 1993

[30] Foreign Application Priority Data

Feb. 7, 1992 [IT] Italy ............... 92-A/000086

[51] Int. Cl.$^5$ .............................................. C01B 3/00
[52] U.S. Cl. .................................... 423/248; 376/146
[58] Field of Search .............. 376/146, 423, 195, 301; 423/651, 248; 55/74, 523

[56] References Cited

U.S. PATENT DOCUMENTS

| | | | |
|---|---|---|---|
| 3,791,106 | 2/1974 | Haley | 55/158 |
| 3,888,974 | 6/1975 | Stevens | 423/580 |
| 4,143,123 | 3/1979 | Butler et al. | 423/580 |
| 4,468,235 | 8/1984 | Hill | 55/16 |
| 4,849,155 | 7/1989 | Penzhorn et al. | 376/146 |
| 5,215,729 | 6/1993 | Buxbaum | 423/248 |

FOREIGN PATENT DOCUMENTS

| | | |
|---|---|---|
| 2334645 | 8/1975 | France. |
| 1532320 | 11/1978 | United Kingdom. |

*Primary Examiner*—Donald P. Walsh
*Assistant Examiner*—Meena Chelliah
*Attorney, Agent, or Firm*—Beveridge, DeGrandi, Weilacher & Young

[57] ABSTRACT

A ceramic catalytic membrane reactor for the separation of hydrogen and/or isotopes thereof from fluid, in particular gaseous flows, formed of a tubular support (1) made of a porous ceramic material, which is coated with layers (4) of a gas-tight material at both ends thereof, and with a thin layer or film (2) of a metal or metal alloy having catalytic activity and selective permeability to hydrogen and isotopes thereof, such as Pd or Pd/Ag, on a central portion thereof, where the reaction takes place. The central portion is provided with heating. The seals (6) of the membrane reactor are located on the two gas-tight ends of the tubular support (1).

11 Claims, 2 Drawing Sheets

CERAMIC CATALYTIC MEMBRANE REACTOR FOR THE SEPARATION OF HYDROGEN AND/OR ISOTOPES THEREOF FROM FLUID FEEDS

INTRODUCTION AND BACKGROUND

The present invention concerns a ceramic catalytic membrane reactor for the separation of hydrogen and/or its isotopes from fluid feeds. More particularly, this invention relates to a tubular membrane reactor, wherein said membrane is selective for hydrogen and its isotopes, and acts further as a catalyst, thus allowing through it an oxidative diffusion of hydrogen. Water is recovered downstream from the membrane.

Separation of hydrogen from gas feeds is quite a common problem in conventional industrial processes, e.g., in the processes of dehydrogenation of organic compounds, in molecular reforming of hydrocarbons, and, more generally, in all those processes where a controlled atmosphere is involved. Normally used equipment includes fixed bed type catalytic reactors, cryogenic systems or systems based on polymeric membranes.

For example, integrated dehydrogenation/separation processes use fixed bed type catalytic reactors, wherein the catalyst is confined within a Pd/Ag membrane. The latter, due to its selectivity, allows only hydrogen to flow outward through the membrane. Thus, hydrogen is removed from the reaction area and the concerned thermodynamic equilibrium is shifted towards the right side. Similarly, N. Itoh, in AIChe J., 33, N.9, 1576 (1987), described the use of a fixed bed membrane reactor comprising a proper catalyst to dehydrogenate cyclohexane to benzene, wherein said membrane was a 200 um thick palladium tube.

Other processes using membranes that were recently developed involve depositing a thin selective film (e.g., Pd or Pd/Ag) on microporous ceramic or porous glass substrates.

In the ceramic material field, the work of Iwahara et al., in Sol. State Ion. 18–19, 1003 (1986) is to be mentioned, wherein a special ceramic material is described as a proton conductor to be used as solid electrolyte to extract electrochemically hydrogen from gas mixtures, as well as, for example, in water vapor electrolysis.

All the membrane processes referred to above exploit the membrane selectivity properties only, and strictly depend upon the ratio of the partial pressures of the permeating gas on the opposite sides of the membrane.

Some solutions have been recently suggested which would allow one to overcome the above problem by combining the selective permeability properties of the membranes at issue with a catalytic activity; that is, the hydrogen, passing through a selective membrane with proper catalytic activity and coming into contact on the other side of the membrane with an oxygen-containing gas, oxidizes and forms water, so that no partial pressure of the permeating gas exists downstream from the membrane.

Itoh (J. Chem. Eng. of Jap., 23, n.1, 81, (1990) applied this principle to an integrated process for cyclohexane dehydrogenation (on one side of the membrane) and hydrogen oxidation (on the opposite of the membrane), using a palladium membrane, while Buxbaum & Hsu (J. Nuc. Mat., 141–143, 238 (1986) applied the sample principle to extracting tritium from a liquid breeder of a nuclear fusion reactor.

With reference to the nuclear field, a main problem of the cycle of the use of nuclear fuel in a fusion reactor is to extract the tritium from the reactor blanket. For example, an actual case involves extracting tritium from the ceramic material into which this isotope is formed by washing the ceramic material with a hydrogen-containing inert gas flow (He or Ar). Both isotopes must then be removed from the inert carrier gas. Usually, such flow is fed to a reactor containing a catalyst bed and is oxidized with $O_2$. The resulting water is then separated by means of a cryo-condensation procedure or by a molecular sieve system. However, the gas resulting from the separation unit cannot be directly recycled, as it contains oxygen.

In such cases the ability to use a catalytic membrane reactor wherein the inert, isotope-containing gas flow is physically kept apart from the oxygen-containing flow, would be very advantageous.

Apart from the case of catalytic membranes entirely made of Pd or Pd/Ag, that cannot be used for industrial scale processes, the solution suggested by the prior art (Buxbaum et al., see above) involves the use of membranes obtained by depositing thin films of a catalyst material (such as, e.g., palladium) on a metal substrate (such as, for example, zirconium, vanadium, niobium, etc.).

However, such prior art solutions have a number of drawbacks, among which, first of all, are those due to the poor permeability of the metal substrate. In view of that, a large exchange surface area is required, and this, obviously, means very high costs both for the equipment and for the material for the catalyst film production.

Secondly, the suggested metal membranes are subject, under the desired working conditions, to embrittling and poisoning effects that could restrict their useful life.

It is further to be taken into account that, in order to have hydrogen and its isotopes react when permeating through the membrane, the membrane at least should reach a temperature ranging from 250° C. to 450° C. Due to the high thermal conductivity of the metal substrate, such temperatures unavoidably cause hydrogen leaks from the equipment seals.

Therefore, an object of the present invention is to provide a catalytic membrane reactor which overcomes the above problems, thus affording the separation and catalytic oxidation of hydrogen and/or isotopes thereof with a high efficiency and with a reduced exchange surface.

SUMMARY OF THE INVENTION

In attaining the above and other objects of the invention, one feature of the invention resides in using as the support for the catalytic layer, instead of a metal substrate, a ceramic material having a porous texture and a high permeability to gases, as well as, of course, good thermal resistance. Further, the processing equipment is so designed that the reaction area is far from the seals. Such arrangement allows one to exploit the low thermal conductivity of the ceramic material for employing conventional seals, which normally would be unable to withstand the operating temperatures of the catalytic membrane.

However, as the ceramic support according to this invention is extremely permeable to hydrogen and its isotopes, a coating must be provided over the ceramic support in the seal area; said coating consisting of a gas-tight material.

Therefore, this invention specifically provides a catalytic membrane reactor for the separation of hydrogen and/or its isotopes from fluid, more particularly gaseous feeds, wherein the catalytic membrane has, as its essential components, a hydrogen permeable tubular support coated with a thin layer or film of metal or metal alloy having catalytic activity and selective permeability to hydrogen (such as, e.g., Pd or Pd/Ag). The tubular support is made of a porous ceramic material, and is coated with said metal or metal alloy film on a central portion only of said reactor length, while both ends of said reactor are coated with a gas-tight material, such as a vitreous material, and are tight-fitted to the reactor shell by means of seals.

In order to optimize the flow of hydrogen and/or its isotopes through the membrane, a proton conductor for high temperatures may be employed as the tubular support or, further, thermodiffusive effects could be exploited.

The central portion of the reactor, which is coated with the metal catalyst film, is heated, preferably electrically, more preferably by means of a wire wound around the tubular support, where the latter is metal coated. Alternatively or additionally the heating coil could be embedded into the ceramic material of the tubular support, or it could be wound inside the support. The same coating of metal catalyst could also be used as the conductor, and in this case no winding would be provided, and a pair of electrical contactors would be fitted to the ends of the reactor central portion.

Since they are not in contact with the hot portion of the reactor, the gaskets sealing the reactor from the exterior conveniently may be O-rings. In particular, each reactor end is equipped with a first O-ring fitted between the ceramic support (in the gas-tight portion thereof) and the terminal closure member of the reactor, and a second O-ring between said closure member and the reactor shell.

BRIEF DESCRIPTION OF DRAWINGS

Further features of the reactor according to this invention shall be described with reference to some preferred embodiments of the invention, as shown in the drawings, wherein.

DETAILED DESCRIPTION OF INVENTION

Figure 1:
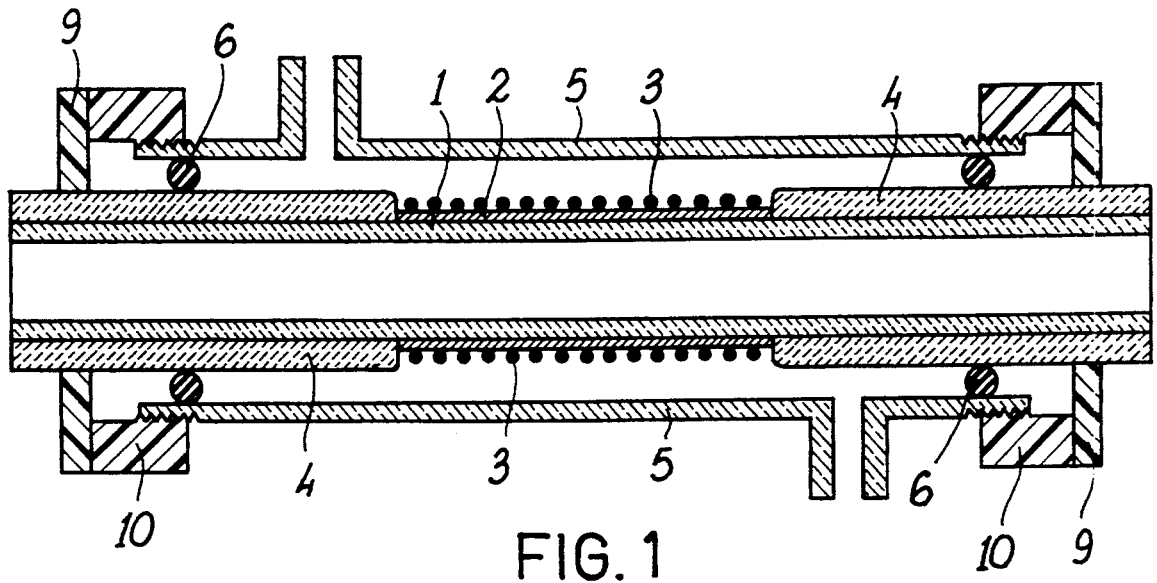
FIG. 1 shows a schematic cross-sectional view of a reactor incorporating the present invention.

The present invention provides a catalytic membrane reactor for the separation of hydrogen and/or its isotopes from fluid feeds, wherein the catalytic membrane includes a hydrogen permeable tubular support (1), coated with a film (2) of metal or of metal alloy having catalytic activity and selective permeability to hydrogen. The tubular support (1) is made of a porous ceramic material, typically an inert inorganic oxide such as alumina or equivalent refractory metal oxide and is coated with said metal or metal alloy film (2) on a circumferential central portion only of said reactor length. The film is generally a noble metal such as palladium or palladium-silver alloy. Both ends of said tubular support (1) are coated with a gas-tight material (4), such as glass and are tight-fitted to the reactor shell (5) by means of seals (6). Glasses for this purpose are known in the art.

The central portion of the reactor length is electrically heated, by means of one or more electrical wires (3), wound on said ceramic tubular support (1) externally and/or internally.

Heating can be provided by means of a conductor (3), made out of the same metal or metal alloy of the said film (2), wound around said central portion of the reactor length and in contact with said film (2).

The seals (6) are O-rings (7,8), and there are two on each end of said reactor length. The first O-ring (7) is fitted between said tubular support (1), where the latter is coated with said gas-tight material (4), and a terminal closure member (9) of the reactor. The second O-ring (8) is fitted between said terminal closure member (9) and said reactor shell (5).

In the reactor of the invention, the terminal closure member (9) is pressed against the second O-ring (8) by an internally threaded nut ring (10) coupled to the externally threaded end of the tubular shell (5).

The terminal closure member (9) is closed, on the side of the tubular support (1), by a flange (11) connected by means of bolts (13) to the terminal closure member (9). This has an internal cylindrical collar (12) which, penetrating between the tubular support (1) and the closure member (9), presses the first O-ring (7) against the tubular support (1) and the terminal closure member (9).

As shown in FIG. 1, a catalytic membrane reactor according to this invention comprises a tubular support (1) made of an inert ceramic material such as, e.g., alumina, whose central portion is coated around its circumference with a 1 um thick palladium layer (2). In order to heat said central portion, where the reaction shall take place, a palladium wire (3) (0.5 mm diameter) is wound around the circumference of the tubular support (1), and is connected to a normal power supply by means of conventional electric connectors (not shown). The choice of palladium as the preferred material for the heating member is due to the need to avoid any perturbation on the oxidation kinetics; the presence of the palladium wire (3) results in an increase of the active catalytic surface area by about 4%.

Two gas-tight layers (4) of vitreous material are provided at both ends of, and bonded to, the tubular support (1), in order to render said ends completely impervious to hydrogen and its isotopes, and to all other gases. The gas-tight layers (4) were obtained by depositing a crystalline composition for refractories on said ends, and by annealing thereafter for 24 hours at 1200° C. Such glass like substances are known in the art.

The resulting catalytic membrane is fitted to a Pyrex glass tubular shell (5) by means of a double seal system of O-rings, which is only schematically shown by the numeral (6) in FIG. 1. The choice of Pyrex glass as the preferred shell material allows, in a device for trial purposes, to minimize the adsorption on the shell walls, which adsorption could affect the measurements. Further, said choice results in the reactor interior being visible. Any equivalent glass can be used. It is clear, however, that the reactor of the invention could alternatively be provided with a metal tubular shell.

The double seal system (6) according to this invention is located in a zone of the reactor which remains at a relatively low temperature (<100° C.) also during the reactor operation (when the reaction zone is within a temperature range of 400°–500° C.) essentially by virtue of the selection of a ceramic material as the support for the catalytic membrane reactor. It is to be pointed out that resilient gasket seals could not be employed in the catalytic membrane reactors with metal supporting substrates of the prior art, nor could such seals be placed, in a reactor with ceramic support, in contact with the catalyst metal coating. If, on the other hand, the seals were placed directly on the porous ceramic support, there would be no problems due to the high reaction temperatures, but leakage through the porous material would be at unacceptable levels. On the contrary, the gas-tight layers (4) exclude the seal areas from the mass transfer process and from the reaction.

Moreover, brazed joints between the metal and the ceramic material are avoided, as they do neither prevent hydrogen permeation and leaks nor guarantee the compatibility of the two materials within a large temperature range.

Figure 2:
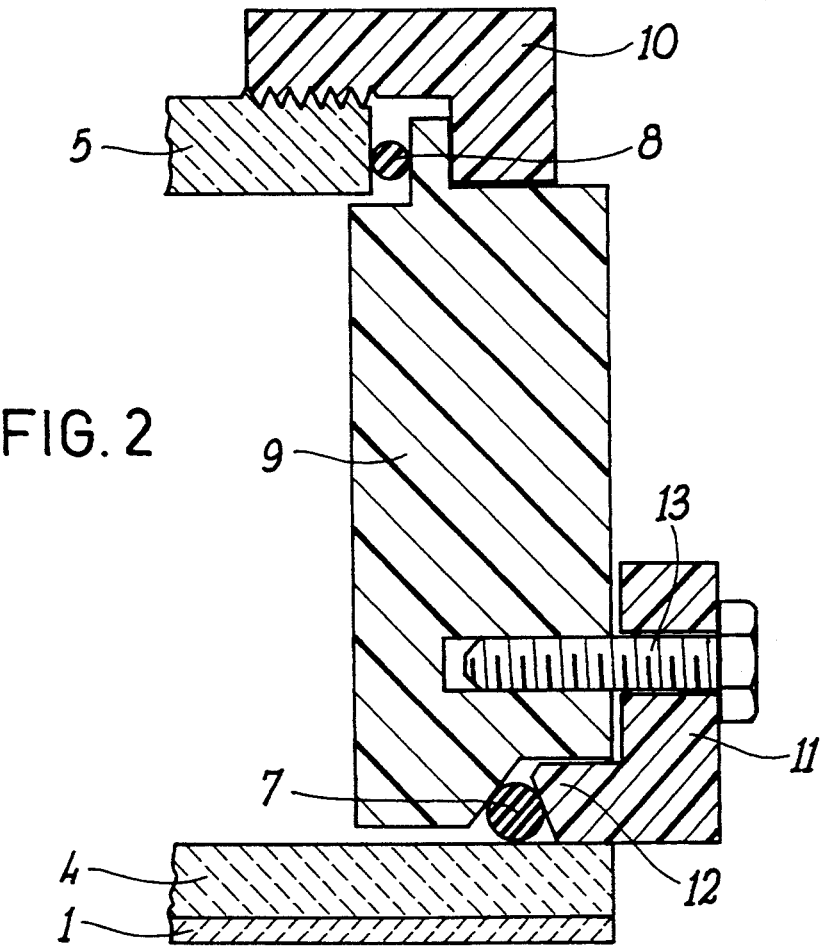
FIG. 2 is a partial cross-sectional view on an enlarged scale of the gas-tight seal system of a reactor of the same kind as that shown in FIG. 1.

The sealing system according to a preferred embodiment of this invention is shown in FIG. 2, which illustrates an enlarged detail, in cross-sectional view, of a reactor of the same kind as that shown in FIG. 1. The corresponding elements are referred to by the same numerals. The seal system (6) schematically shown in FIG. 1 is shown more in detail in FIG. 2, as comprising two separate O-rings (7) and (8), the first O-ring (7) providing a gas-tight seal between the gas-tight layer (4) on the ceramic tubular support (1) and a terminal closure member (9) made out of Teflon, or other suitable polymeric material. The second O-ring (8) provides a gas-tight seal between the tubular shell (5) of the reactor and the terminal closure member (9). The latter is pressed against the second O-ring (8) by an internally threaded plastic nut ring (10) coupled to the externally threaded end of the tubular shell (5).

In turns, the first O-ring (7) is pressed among the gas-tight layer (4) of the tubular support (1), the terminal closure member (9) and a flange (11) having an internal cylindrical collar (12). The collar (12) is fastened to the terminal closure member (9) by means of bolts (13). The inherent deformability of the O-rings, as well as their ability to allow not only radial expansions of the tubular support (1), but also the axial sliding thereof without affecting the sealing characteristics, prevents any breaking of the ceramic material as a result of differential thermal expansion.

The reactor according to this invention can be used, as set forth before, to separate hydrogen and/or its isotopes from a hydrogen-containing gas feed. The gaseous stream is fed in the tube side of the catalytic membrane reactor, while an inert, oxygen-containing gas flow is supplied from the shell side. The inert gas employed is, preferably, the same as that flowing in the tube side, in order to avoid any problems due to permeation. The hydrogen isotopes permeate through the ceramic support (1) and through the palladium layer (2), and when subjected to the reaction temperature produced by the heating system with the palladium wire (3), they react with the oxygen adsorbed by the palladium layer (2). The water resulting from the reaction is desorbed from the film and is finally removed by the gas flowing in the shell side. This gas then can then be dehydrated by means of a molecular sieve or a cryogenic trap.

The previously described reactor was used experimentally to separate hydrogen from an argon feed with 1% of hydrogen, feeding the shell side of the reactor with an argon feed with 1% of oxygen.

The internal diameter of the ceramic tubular support (1) was 0.008 m, the palladium film, thickness was about 1 um and the length of the catalytic zone was 0.1 m. The unit was equipped with flow-meters, control valves and various sampling points for gas-chromatographic analysis and humidity analysis.

The operating temperature range from 100° C. to 250° C. (being maintained constant during each trial): the pressure was in the range from 100 kPa and 103 kPa, and the flow rate of the gases on each side of the equipment ranged from $60 \times 10^{-6}$ to $85 \times 10^{-6}$ m$^3$/min. The conversion was quantified as the ratio between the hydrogen converted to water and the hydrogen of the starting feed, taking into account in the mass balance of the inherent humidity of the starting feed.

Figure 3:
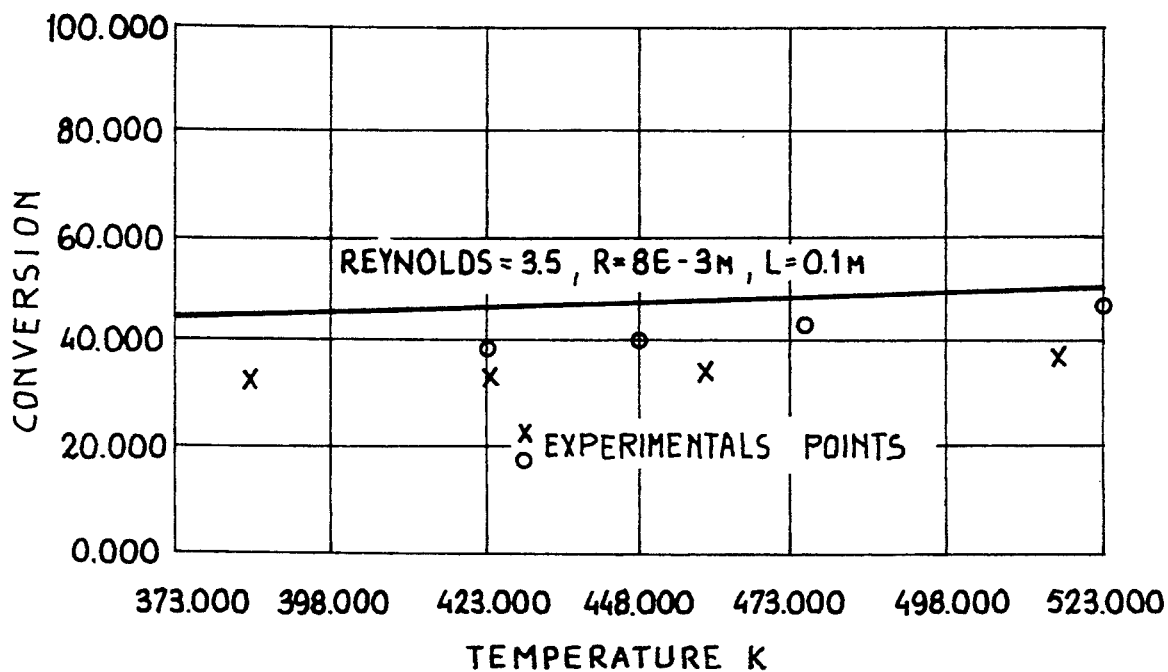
FIG. 3 is a graph showing the relationship between conversion and temperature from experimental tests carried out on a trial reactor according to this invention.

FIG. 3 shows the relationship between conversion and operating temperature of the reactor; while the continuous curve shows the theoretical conversion, as calculated by means of a mathematic model, the circles and the crosses represent the experimental points. Specifically, the circles and the curve refer to identical operating conditions, with the small deviations being probably due to the effect of surface defects in the palladium coating. As a matter of fact, the microscopic discontinuities that are present when the palladium deposition technique employed is not sufficiently advanced, could short-circuit a fraction of the hydrogen treated. Since it does not come into contact with the catalyst, said hydrogen fraction is not oxidized.

Figure 4:
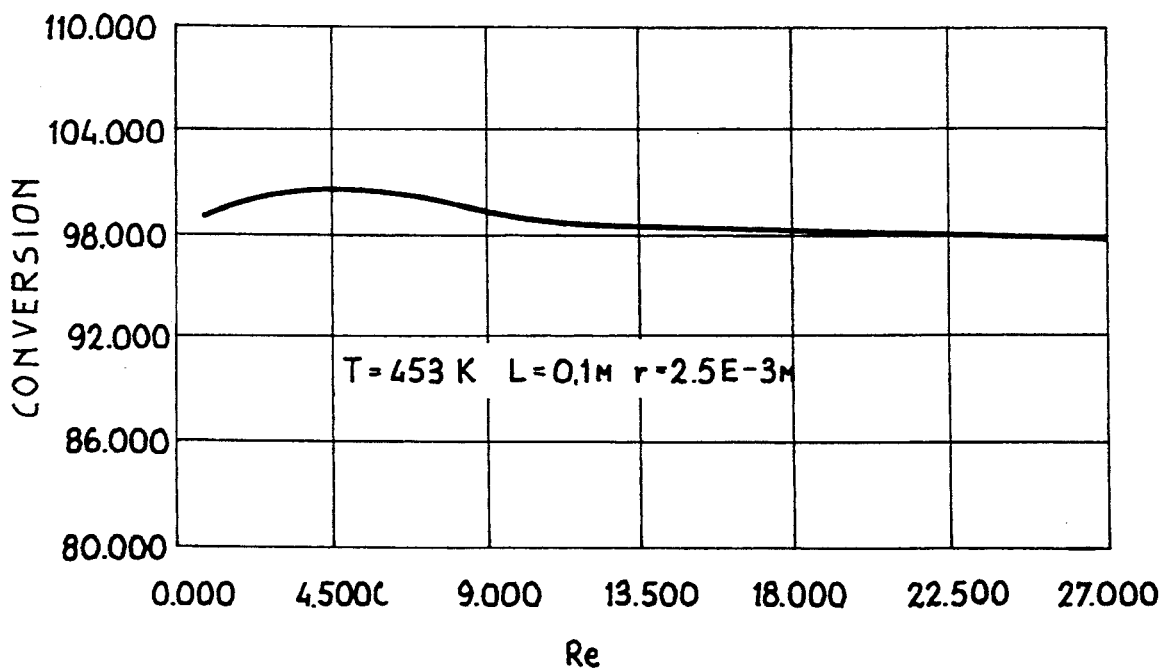
FIG. 4 is a graph showing the relationship between conversion and Reynolds number on a theoretical basis.

The obtained conversion rates, as shown in FIG. 3, range between 42% and 43%. However, it is obvious that very high conversion rates, up to over 99%, could be obtained by optimizing the reactor geometry. This is apparent from the graph of FIG. 4, where the theoretical conversion run is shown as a function of the Reynolds number. As shown in FIG. 4, a quite complete conversion can be reached under proper flow conditions.

The presence of a peak on the curve of FIG. 4 can be explained if one considers that the conversion is the result of two opposite tendencies: by increasing the Reynolds number the film resistance to mass transfer is decreased, but at the same time the dwelling time decreases as well.

As previously observed, optimized operation of a reactor according to this invention strictly depends upon a good quality of the catalyst material (the thickness of which could typically be in the range of 10–100 um), as well as on the quality of the ceramic support. In particular, a ceramic material with a top-layer obtained by a known sol-gel technique could advantageously be used, said material having surface pore size of about 2 um. The Pd or Pd/Ag coating is deposited by electrosputtering, electrophoresis, plasma or electroless procedures. Alternatively the substrate material could be made out of porous glass; finally, the catalyst film could also be electrodeposited.

It is to be pointed out that an improvement of the quality of the catalyst deposit not only results in an improvement of the chemical conversion, but also prevents any inverse diffusion phenomenon and increases the selectivity for hydrogen.

In view of the foregoing, the equipment according to this invention could be profitably used to separate tritium in the fuel cycle in tokamak units, as previously mentioned. Further, said equipment could be used in a number of other processes, i.e. in all cases where hydrogen and/or isotopes thereof are to be separated from fluid feeds containing them, e.g. in the chemical dehydrogenation of organic compounds. In the latter case, the tubular ceramic support of the reactor could be filled in with a pelletized dehydrogenation catalyst and, as the pelletized catalyst could be designed to operate at a temperature significantly lower than that attained on the metal catalyst film in order to prevent catalyst poisoning, the relevant reactor could be equipped with an inner coaxial tube in the catalyst bed for circulation of a cooling liquid. Another possible cooling method would be to divide the reactor into multiple stages, intercalating the reaction stages with cooling systems.

As a considerably high rate of isotope separation was theoretically detected, the reactor of this invention could be used to separate two hydrogen isotopes from each other, by means of a cascade operation to be carried out on a multistage equipment.

As it is clear from the above description, the catalytic membrane reactor of this invention shows, when compared with the conventional fixed bed catalytic reactors, the actual advantage to keep the two gas flows in the process fully separated, if the metal coating is defect-free. When compared with the metal substrate membrane reactors, the reactor of the invention shows an overall resistance to mass transfer through the membrane that is significantly lower; this, as already pointed out, means a lower exchange surface area and, accordingly, a saving both for the equipment dimensions and for the requested amount for the catalyst metal.

This invention has described with specific reference to certain preferred embodiments thereof, but is to be understood that modifications and changes could be brought to it by those who are skilled in the art without departing from its true spirit and scope. Italian priority application Rm92-A/000086 of Feb. 7, 1992 is relied on and incorporated by reference herein.

We claim:

1. A catalytic membrane reactor for the separation of hydrogen, isotopes of hydrogen, or hydrogen and its isotopes from fluid feeds, wherein the catalytic membrane comprises a hydrogen permeable tubular support made of a porous ceramic material, coated with a film of metal or of metal alloy, having catalytic activity and selective permeability to hydrogen, on a central outside portion only of said reactor length, both ends of said tubular support being coated on the outside with a gas-tight material and tight-fitted to the reactor shell by means of seals.

2. The reactor according to claim 1, wherein said central portion of the reactor length is electrically heated.

3. The reactor according to claim 2, wherein the heating is provided by means of one or more electrical wires wound on said ceramic tubular support externally and/or internally.

4. The reactor according to claim 2, wherein the heating is provided by means of a conductor, made out of the same metal or metal alloy of the said film, wound around said central portion of the reactor length and in contact with said film.

5. The reactor according to claim 1, wherein said seals are O-rings are two of said O-rings being on each end of said reactor length, the first O-ring being fitted between said tubular support, where the latter is coated with said gas-tight material and a terminal closure member of the reactor, and the second O-ring being fitted between said terminal closure member and said reactor shell (5).

6. The reactor according to claim 5, wherein said terminal closure member is pressed against said second O-ring by an internally threaded nut ring coupled to the externally threaded end of said tubular shell.

7. The reactor according to claim 5, wherein said terminal closure member is closed, on the side of said tubular support, by a flange connected by means of bolts to said terminal closure member and having an internal cylindrical collar which, penetrating between said tubular support and said closure member, presses said first O-ring against said tubular support and said terminal closure member.

8. The reactor according to claim 1, wherein said metal or metal alloy film is made of palladium or of a palladium/silver alloy.

9. The reactor according to claim 1, wherein said gas-tight material is a vitreous material.

10. The reactor according to claim 9, wherein said vitreous material is a crystalline composition for refractory materials.

11. The reactor according to claim 1, wherein said shell is made of Pyrex glass.

* * * * *